Figures 1, 2:
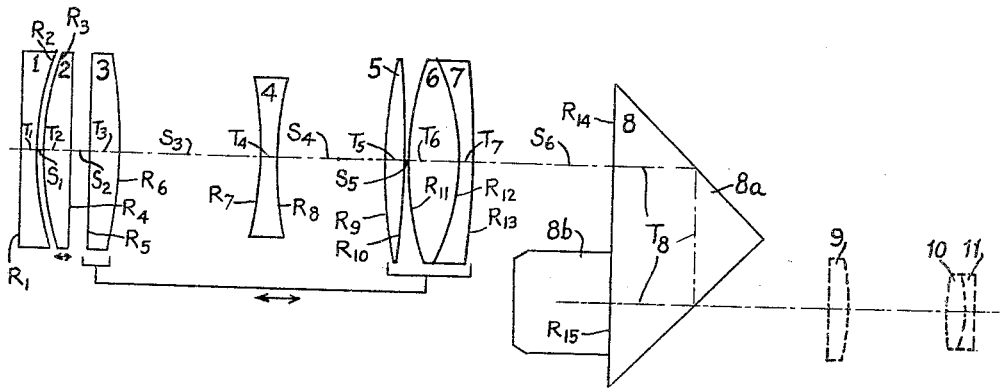

| Lens | $N_D$ | V | Radii, mm. | Thicknesses, mm. |
|---|---|---|---|---|
| 1 | 1.6110 | 58.8 | $R_1 = \infty$ | $T_1 = 3.0$ |
| 2 | 1.6203 | 60.3 | $R_2 = +58.49$ | $S_1$ varies, 1.0 to 2.2 |
|   |        |      | $R_3 = +60.0$  | $T_2 = 6.0$ |
| 3 | 1.5880 | 53.4 | $R_4 = \infty$ | $S_2$ varies, 3.5 to 21.0 |
|   |        |      | $R_5 = \infty$ | $T_3 = 6.0$ |
| 4 | 1.6570 | 57.2 | $R_6 = -101.64$ | $S_3$ varies, 28.0 to 45.5 |
|   |        |      | $R_7 = -74.07$  | $T_4 = 3.0$ |
| 5 | 1.5725 | 42.5 | $R_8 = +74.07$  | $S_4 = 49.1 - S_3$ |
|   |        |      | $R_9 = +98.85$  | $T_5 = 4.5$ |
| 6 | 1.5725 | 57.4 | $R_{10} = -909.1$ | $S_5 = 0.3$ |
| 7 | 1.6890 | 30.9 | $R_{11} = +63.29$ | $T_6 = 9.5$ |
|   |        |      | $R_{12} = -46.08$ | $T_7 = 3.0$ |
| 8 | 1.6203 | 60.3 | $R_{13} = -263.15$ | $S_6 = S_3$ |
|   |        |      | $R_{14} = \infty$  | $T_8 = 90.0$ |
|   |        |      | $R_{15} = \infty$  |   |

3,069,972
OPTICAL SYSTEM FOR ZOOM BINOCULARS
Raymond E. Tibbetts and David C. Gilkeson, Rochester, N.Y., assignors to Revere Camera Company (formerly Samica Corporation), Chicago, Ill., a corporation of Delaware
Filed Jan. 25, 1961, Ser. No. 84,785
7 Claims. (Cl. 88—57)

The present invention relates to binoculars of the variable magnification or "zoom" type, and more particularly to the objective optical system for such binoculars, as distinguished from the eyepiece optical system and from the mechanical mounting of the parts.

An object of the invention is the provision of a generally improved and more satisfactory objective optical system for variable magnification or zoom binoculars.

Another object is the provision of an improved binocular optical system wherein variable magnification is achieved entirely by manipulation of the objective system, and preferably one wherein the ratio of maximum magnification to minimum magnification is about 1½ to 1, e.g., variable between the limits of approximately 9 diameters and 6 diameters.

Still another object is the provision of a variable magnification objective system for binoculars, of the positive-negative-positive type, wherein the two positive groups are mechanically joined to move in unison to produce the desired variation in focal length or magnification power, the system being so designed that a residual focal shift occurring upon adjustment of magnification power is within the range of accommodation of the user's eye.

A further object is the provision of an objective optical system for binoculars which, in combination with its Porro prism, is corrected to a high degree, especially for spherical aberration and longitudinal chromatic aberration.

A still further object is to provide simple means for focusing the binocular to various distances without substantially increasing the small focal shift resulting from a change in magnification power.

These and other desirable objects may be attained in the manner disclosed as an illustrative embodiment of the invention in the following description and in the accompanying drawings forming a part hereof, in which:

FIG. 1 is a diagrammatic view of the optical system for one barrel of a binocular according to a preferred embodiment of the present invention, the objective optical system and the prism being shown in full lines, and the eyepiece optical system being indicated in broken lines; and FIG. 2 is a table of numerical data for the objective optical system according to one specific embodiment of the invention.

For observing sports events, such as football games and horse races, it is quite common to use what is known as a 6×30 binocular; that is, a binocular having a magnification power of 6 diameters, and an entrance pupil 30 millimeters in diameter. Hunters attempting to locate game in clear mountain areas frequently use a 9×35 binocular. The binocular of the present invention takes the place of and can be used for the purposes of both of the binoculars above mentioned, as its range is variable from 6×35 to 9×35, the entire 35 millimeter entrance pupil being utilized throughout the entire zoom range from 6 diameters to 9 diameters.

The binocular of the present invention has, as usual, two barrels containing the two optical systems, one for each eye of the observer. Since the details of the mechanical construction of the barrels, and the mechanical mounting of the optical parts are unimportant for purposes of the present invention, they are not shown here, and such details may be widely varied without departing from the invention. It is sufficient to say that focusing for different object distances is preferably accomplished by turning a knurled ring or knob located centrally between the two barrels, as in the conventional normal binocular, while the zooming movement for change of magnification power is accomplished by moving a knurled ring located on one of the two barrels, conveniently on the right hand barrel.

The optical system in each barrel of the binocular is identical with that in the other, so a description of one will suffice for both.

In the embodiment of the invention illustrated diagrammatically in FIG. 1, the optical system comprises an objective system of seven lens elements, numbered from 1 to 7 consecutively from front toward rear, followed by a Porro prism system indicated in general at 8, followed in turn by any suitable eyepiece system such as the three lens elements 9, 10, and 11. The details of the eyepiece optical system (which may be referred to for brevity merely as the eyepiece) may be varied widely without departing from the present invention, and to emphasize this fact the three eyepiece lens elements shown by way of example are indicated merely by broken lines. The Porro prism system is of conventional type commonly found in a binocular, consisting of two separate prism elements 8a and 8b with their axes perpendicular to each other, together constituting what is often referred to by optical engineers as a Porro prism system of the first type. They may be collectively referred to merely as the Porro prism, for brevity.

In the following disclosure and in the claims, radii of curvature R, the axial thicknesses T of the lens elements, and the spacings S between elements, are all expressed in the customary manner, with the usual subscripts indicating the particular surface, lens thickness, or air space, separately numbered in sequence from front to rear. All the lens elements (of the objective) are air spaced, except elements 6 and 7, which together form a cemented doublet, so that $R_{12}$ is the radius of curvature of the rear surface of element 6 and also the front surface of element 7. Since there is no air space between elements 6 and 7, the designation $S_6$ refers to the space behind element 7, i.e., the space between it and the Porro prism 8. In accordance with customary optical patent practice, a plus value of R indicates a surface convex toward the front, i.e., one whose center of curvature is to the rear of the surface in question, while a minus value of R indicates a surface concave toward the front, i.e., one whose center of curvature is in front of the surface referred to. Of course an infinity value of R indicates a plane surface.

The focal lengths of certain individual lens elements are denoted by $f$ with a subscript corresponding to the number of that particular lens element. The equivalent focal length of what may be termed the rear group (i.e., the elements 5, 6, and 7, considered together as a group) is denoted by $f_g$. A positive value of $f$ indicates a positive or converging lens element (or group) and a negative value of $f$ indicates a negative or diverging element (or groups).

The respective refractive indices, expressed with reference to the spectral D line of sodium, are indicated by N (or in some cases by $N_D$) and the dispersive indices or Abbe numbers are indicated by V. The diameters of the respective lens elements are designated by D. All linear dimensions (D, R, S, T, and $f$) are expressed in millimeters wherever specific examples of dimensions are given, although it must be understood that the relationship of these dimensions to each other is more important than the absolute dimensions; i.e., the dimensions may be varied considerably if all of them are increased or decreased in the same proportion.

According to the present invention, good results are attained when the below-indicated variable factors of the objective optical system are kept substantially within the ranges or limits indicated by the following notations:

*Table 1*

$2.25f_g < f_3 < 3.05f_g$
$.73f_g < f_4 < .99f_g$
$11.00f_3 < R_5 \leqslant \infty$
$.50f_3 < -R_6 < .68f_3$
$1.12f_4 < R_7 < 1.52f_4$
$1.12f_4 < -R_8 < 1.52f_4$
$1.29f_g < R_9 < 1.74f_g$
$11.8f_g < -R_{10} < 16.1f_g$
$.82f_g < R_{11} < 1.12f_g$
$.60f_g < -R_{12} < .82f_g$
$3.4f_g < -R_{13} < 4.6f_g$ In the specific example of a lens as given below in Table 2, the value of $f_g$ is 65.3 millimeters, but this value may, of course, be changed to any desired extent, so long as the relative proportions mentioned in the above Table 1 are maintained.

A specific example of a zoom binocular objective system whose variables fall within the above mentioned ranges or limits of Table 1, and which is highly satisfactory in practice, may be constructed in accordance with the data given in the following table:

*Table 2*

| Lens | $N_D$ | V | D | Radii | Thicknesses |
|---|---|---|---|---|---|
| 1 | 1.6110 | 58.8 | 38.0 | $R_1 = \infty$ | $T_1 = 3.0$ |
|   |        |      |      | $R_2 = +58.49$ | $S_1$ varies 1.0 to 2.2 |
| 2 | 1.6203 | 60.3 | 38.0 | $R_3 = +60.0$ | $T_2 = 6.0$ |
|   |        |      |      | $R_4 = \infty$ | $S_2$ varies 3.5 to 21.0 |
| 3 | 1.5880 | 53.4 | 38.0 | $R_5 = \infty$ | $T_3 = 6.0$ |
|   |        |      |      | $R_6 = -101.64$ | $S_3$ varies 28.0 to 45.5 |
| 4 | 1.6570 | 57.2 | 31.0 | $R_7 = -74.07$ | $T_4 = 3.0$ |
|   |        |      |      | $R_8 = +74.07$ | $S_4 = 49.1 - S_3$ |
| 5 | 1.5725 | 42.5 | 40.0 | $R_9 = +98.85$ | $T_5 = 4.5$ |
|   |        |      |      | $R_{10} = -909.1$ | $S_5 = 0.3$ |
|   |        |      |      | $R_{11} = +63.29$ |  |
| 6 | 1.5725 | 57.4 | 40.0 |  | $T_6 = 9.5$ |
|   |        |      |      | $R_{12} = -46.08$ |  |
| 7 | 1.6890 | 30.9 | 40.0 | $R_{13} = -263.15$ | $T_7 = 3.0$ |
|   |        |      |      |  | $S_6 = S_3$ |
|   |        |      |      | $R_{14} = \infty$ |  |
| 8 | 1.6023 | 60.3 |   |  | $T_8 = 90.0$ |
|   |        |      |      | $R_{15} = \infty$ |  |

In the foregoing Table 2, the total axial thickness of the Porro prism system (two prisms 8a and 8b) is designated $T_8$ and the entrance and exit surfaces thereof are designated $R_{14}$ and $R_{15}$.

Behind the Porro prism system is the eyepiece optical system which, as indicated above, may be varied quite widely, the details thereof being not critical for purposes of the present invention, so long as the equivalent focal length of the eyepiece system is within the range herein indicated. Merely as a typical example of an eyepiece system, it may comprise a field lens 9 and an eye lens in the form of a cemented doublet of two elements 10, 11, all of these elements 9, 10, and 11 being shown diagrammatically in broken lines to emphasize the fact that they are not critical for present purposes.

In the specific example, elements 3, 5, 6, and 7 are all coupled together to move axially as a unit, at constant axial relation to each other, to produce the zoom effect or change in magnification power (which can also be referred to as a change in equivalent focal length) of the system. Elements 1 and 4 remain stationary. Therefore, since elements 3, 5, 6, and 7 move axially as a unit, while element 4 is stationary, it follows that as $S_3$ decreases, $S_4$ increases by the same amount, and vice versa. In other words, the sum of the spacings $S_3$ plus $S_4$ is a constant in all positions of adjustment. Likewise, since the Porro prism system is also fixed, like the element 4, it follows that the sum of the spaces $S_4$ and $S_6$ is a constant in all positions of zooming adjustment, one decreasing as the other increases, and vice versa. Preferably $S_3$ is equal to $S_6$.

As an example, assuming that the objective system is used with an eyepiece system having an equivalent focal length of 23.8 millimeters, then when the objective system is adjusted to the low power or 6× position (magnification of 6 diameters) $S_3$ and $S_6$ are both 28.0 mm. and $S_4$ is 21.1 mm., and the equivalent focal length is 142.1 mm. When adjusted to the high power or 9× position, to give a magnification of 9 diameters, $S_3$ and $S_6$ are both 45.5 mm., $S_4$ is 3.6 mm., and the equivalent focal length is 214.2 mm. When adjusted to an intermediate position to give a magnification of approximately 7.3 diameters, $S_3$ and $S_6$ are both 36.75 mm., $S_4$ is 12.35 mm., and the equivalent focal length is 174.5 mm. The above mentioned 6× and 9× positions represent the extreme positions of adjustment according to the specific example here given. It will be noted that in each case, $S_6$ is equal to $S_3$, and that $S_4$ equals 49.10 mm. minus $S_3$ (or minus $S_6$, which is equal to $S_3$). The space $S_5$ is a constant since the elements 5 and 6 are fixed relative to each other and move axially as a unit.

The intermediate adjustment position or 7.3× position is given merely as an example. Actually, the parts are adjustable to an infinite number of intermediate positions within the above indicated range, so that any desired magnification within the limits of 6× and 9× can be obtained.

The variation of the air space $S_2$ has no effect upon the zooming action of the objective system. When zooming adjustment is made, the space $S_2$ changes merely because the elements 1 and 2 remain stationary during the zooming movement, and a sufficient minimum space $S_2$ must exist for clearance purposes. It may be explained here that the range of variation of $S_2$ as stated in foregoing Table 2 is the range when element 2 is in its forward position, to focus the objective on objects at infinity. As explained below, focusing on objects at closer distances is accomplished by moving element 2 rearwardly, so whenever the objective is focused on an object closer than infinity, both the upper and lower limits of the range of $S_2$ as stated in Table 2 are reduced by an amount equal to the rearward focusing shift of element 2. Thus when element 2 is in its extreme rearward position (focused at 25 feet instead of infinity, as explained below) $S_1$ becomes 2.2 mm. instead of 1.0 mm., and the range of variation of $S_2$ then becomes 2.3 to 19.8 mm. instead of 3.5 to 21.0.

In this type of zoom optical system, a slight focal shift is inevitable during the range of adjustment. In the particular system disclosed as a specific example, the back focal length for the high power or 9× position and the low power or 6× position are the same, while the back focal length for the above mentioned intermediate position or 7.3× position is about 0.16 mm. longer. Still assuming that the eyepiece used is one having an equivalent focal length of 23.8 mm., this slight focal shift (or shift in back focal length) at the intermediate adjustment position amounts to a dioptric error of about plus or minus 0.14 diopter. Such a small error is easily within the range of accommodation of the observer's eyes, and so should cause no difficulty.

Since a zoom system retains its initial residual focal shift (or change in back focal distance) at only a single object distance for which the system has been designed (in this case, an object distance of infinity), it follows that focusing the system for any other object distance cannot be accomplished in the customary manner by moving the eyepieces axially, as is done in ordinary non-zooming binoculars. Instead, focusing for different object distances is accomplished in the present construction by slightly changing the axial position of element 2, while element 1 remains stationary. For focusing (as distinguished from the zooming movement to vary the magnification power) the space $S_1$ is varied from 1.0 mm. to 2.2 mm., thereby changing the object distance focused upon from infinity to 25 feet. Since element 1 remains entirely stationary, both during the focusing movement and during the zooming movement, it follows that element 1 can be tightly mounted to act as a window to seal the front of the lens tube or barrel against entrance of dirt or moisture. Element 2 is axially movable for focusing in any convenient known manner, such as by screw thread controlled by a central knurled ring or knob which simultaneously moves the elements 2 in both barrels or tubes of the binocular.

For the sake of comparison with the focusing arrangement above mentioned, it may be pointed out that if it were attempted to focus the zoom objective system in the conventional manner, there would be errors considerably beyond the power of accommodation of the eye of the observer. If the eyepieces were shifted rearwardly away from the objectives to focus at 25 feet, for example, the focal error would amount to approximately minus 3.4 diopters at 9× magnification, and approximately plus 2.6 diopters at 6× magnification. Such a change in accommodation could not be tolerated.

With the focusing arrangement of the present invention, the user would set both eyepieces at zero diopter if he is emmetropic (or at some other setting, if he removes his glasses and needs an eye correction) and would then focus the binocular at the desired object distance by means of the central knurled ring which moves the elements 2 in both lens barrels, for object focusing. Thus the relation of the eyepiece to that part of the objective system which is behind element 2 is always the relationship of focusing on infinity, which is the position for which the binocular is designed to perform best. It is important for the user to set the eyepieces initially to match his eye correction (unless he wears glasses which give the required correction), for if he does not do this, the objectives will not be focused at infinity, and large intolerable dioptric errors will arise.

The shape of the lens element 3 is somewhat unusual for light coming from infinity, but it must introduce a relatively large amount of undercorrected spherical aberration, to insure low residual aberration especially in the 6× position. If element 3 were bent slightly to the right, the marginal spherical aberration in the 6× position would rapidly become quite overcorrected.

Element 4 is of rather high index glass, mainly for the reason that in the 6× position the front surface of element 4 lowers the lower oblique rays quite badly, and in the 9× position its rear surface raises the upper oblique rays, introducing excessive coma. Since the overcorrected spherical aberration contribution of this element 4 is needed, it cannot be split into two elements of more desirable shapes for the oblique bundles of rays, but instead it must be made of a higher index glass with flatter curves. The refractive index of element 4 should be between 1.63 and 1.68, for the best compromise between spherical aberration and coma correction.

The rear group (elements 5, 6, and 7 taken collectively) has been designed to afford a higher degree of correction for all aberrations, especially with regard to spherical aberration and lateral color. However, if one is willing to compromise on the degree of optical correction, this rear group can be replaced by a simple lens or a simple doublet.

As above mentioned, an eyepiece having an equivalent focal length of 23.8 mm. is the preferred eyepiece for use when the magnification power is to be varied within the range of 6× to 9×. Other eyepieces of other equivalent focal lengths can be substituted, to produce other ranges of magnification power, within sensible limits, without departing from the scope of the invention.

Variations in the dimensions given in the above specific example are possible, but such variations should preferably be kept within the limits previously mentioned in Table 1.

Considered broadly, all of the above mentioned elements 1–8 may be collectively regarded as the objective optical system, as distinguished from the eyepiece optical system 9–11, and they have been so designated in various places above. However, viewed from a different standpoint, the objective optical system may be said to consist only of elements 3–7 (or at most, elements 3–8) while elements 1 and 2 may be regarded as a special supplementary optical system introduced in front of the true objective system for purposes of focusing for distances short of infinity, the rest of the system (objective 3–8 and eyepiece 9–11) always remaining focused on infinity regardless of the zooming movement to change the magnification power.

Other possible nomenclature would be to call elements 1 and 2 the focusing lenses or focusing system or group, and to call elements 3–7 the zoom lenses or zoom system or group, or the objective system, using this latter name in the narrower sense above explained.

From what has been said above, it will be understood that if the binocular were to be used always at infinity distance, elements 1 and 2 could be entirely omitted, and the remaining elements 3–8 plus a suitable eyepiece (9–11) would constitute an acceptable and efficient variable magnification (or zoom) binocular optical system, focused always on infinity, however.

What is claimed is:

1. A zoom binocular optical system comprising a plurality of lens elements collectively constituting a zoom group adjustable to vary the magnification power of the optical system, a Porro prism system behind the zoom group, and an eyepiece system behind the Porro prism system, the zoom group having five lens elements of which the first, second, and third are air spaced from each other and the fourth and fifth together constitute a cemented doublet air spaced from the third, the characteristics of the lens elements of said zoom group and their spatial relationship to each other being substantially in the proportions indicated by the data in the following table:

| Lens | $N_D$ | V | Radii, mm. | Thicknesses, mm. |
|---|---|---|---|---|
| 3 | 1.5880 | 53.4 | $R_5 = \infty$ | $T_3 = 6.0$ |
|   |   |   | $R_6 = -101.64$ | $S_3$ varies 28.0 to 45.5 |
| 4 | 1.6570 | 57.2 | $R_7 = -74.07$ | $T_4 = 3.0$ |
|   |   |   | $R_8 = +74.07$ | $S_4 = 49.1 - S_3$ |
| 5 | 1.5725 | 42.5 | $R_9 = +98.85$ | $T_5 = 4.5$ |
|   |   |   | $R_{10} = -909.1$ | $S_5 = 0.3$ |
| 6 | 1.5725 | 57.4 | $R_{11} = +6329$ | $T_6 = 9.5$ |
| 7 | 1.6890 | 30.9 | $R_{12} = -46.08$ | $T_7 = 3.0$ |
|   |   |   | $R_{13} = -263.15$ |   | wherein the lens elements are numbered in order from front to rear in the first column beginning with the first element of the zoom group herein numbered as lens 3 and ending with the fifth element of the zoom group herein numbered as lens 7, the corresponding refractive indices N for the D line of the spectrum are given in the second column, the corresponding dispersive indices V are given in the third column, the radii of curvature R of the lens surfaces are given in the fourth column, the respective surfaces being numbered consecutively from front to rear and being respectively identified by the subscript numeral used with each R, beginning with $R_5$ as the front surface of lens 3 and ending with $R_{13}$ as the rear surface of lens 7, the rear surface of lens 6 and the front surface of lens 7 having a common radius designated as $R_{12}$, the plus and minus values of R indicating curved surfaces which are respectively convex and concave toward the front, the axial thicknesses T of the respective lens elements and the axial thicknesses S of the air spaces between lens elements being given in the fifth column, the respective lens element thicknesses being identified by numerical subscripts corresponding to the lens numbers used in the first column, the respective air spaces being numbered consecutively from front to rear and being indicated respectively by numerical subscripts, beginning with $S_3$ to indicate the space between lens 3 and lens 4, the lens elements designated in the first column as lenses 3, 5, 6, and 7 being axially movable in unison without change of axial spacing between them, to vary the magnification power, lens element 4 and said Porro prism system and said eyepiece system remaining axially stationary during change in magnification power.

2. A construction as defined in claim 1, further including a focusing lens group arranged axially in front of said zoom lens group, said focusing lens group having two lens elements one of which remains axially stationary for focusing and the other of which is axially movable for focusing, independently of the axial movements of said zoom lens group for varying the magnification power.

3. A construction as defined in claim 1, further including a focusing lens group arranged axially in front of said zoom lens group, said focusing lens group comprising a front lens element of negative power remaining axially stationary and a second lens element of positive power arranged immediately behind said front lens element and axially movable for focusing, independently of axial zooming movement of said zoom lens group for change of magnification power, said second lens element remaining stationary during change of magnification power.

4. A construction as defined in claim 1, further including a focusing lens group arranged axially in front of said zoom lens group, said focusing lens group comprising two lens elements, the characteristics of which and their relationship to each other being substantially in the proportions indicated by the data in the following table:

| Lens | N | V | Radii, mm. | Thicknesses, mm. |
| --- | --- | --- | --- | --- |
| 1 | 1.6110 | 58.8 | $R_1 = \infty$<br>$R_2 = +58.49$ | $T_1 = 3.0$<br>$S_1$ varies, 1.0 to 2.2 |
| 2 | 1.6203 | 60.3 | $R_3 = +60.0$<br>$R_4 = \infty$ | $T_2 = 6.0$ | wherein said lens elements of said focusing lens group are numbered from front to rear in the first column, the corresponding refractive indices N for the D line of the spectrum are given in the second column, the corresponding dispersive indices V are given in the third column, the radii of curvature R of the lens surfaces are given in the fourth column, the respective surfaces being numbered consecutively from front to rear and being respectively identified by the subscript numeral used with each R, the plus values of R indicating curved surfaces which are convex toward the front, the axial thicknesses T of the respective lens elements and the axial thicknesses S of the air space between the lens elements being given in the fifth column, the respective lens element thicknesses being identified by numerical subscripts corresponding to the lens numbers used in the first column, the lens element numbered 1 being axially stationary, the element numbered 2 being axially movable through the range indicated by $S_1$ in the fifth column, the axial air space between lens element 2 of the focusing group and lens element 3 of the zoom group, when both of these elements are in their most forward positions, being substantially 3.5 mm.

5. A construction as defined in claim 4, wherein the Porro prism system is made of material having a refractive index of substantially 1.6203 and a dispersive index of substantially 60.3 and has an axial thickness along the light path of substantially 90.0 mm. and has plane entrance and exit faces.

6. A construction as defined in claim 4, wherein the Porro prism system is made of material having a refractive index of substantially 1.6203 and a dispersive index of substantially 60.3 and has an axial thickness along the light path of substantially 90.0 mm. and has plane entrance and exit faces, and wherein the axial air space from the rear face of the lens element designated as lens 7, to the front face of the Porro prism system, in all positions of zooming adjustment of the zoom group, is substantially equal to the space designated as $S_3$.

7. A construction as defined in claim 6, wherein the equivalent focal length of the zoom group may be varied within the range of substantially 142.1 mm. to 214.2 mm., to yield, wthen the eyepiece system has an equivalent focal length of 23.8 mm., any desired magnification within the range of substantially 6× to 9×.

References Cited in the file of this patent

UNITED STATES PATENTS

| | | |
| --- | --- | --- |
| 2,741,947 | Back | Apr. 17, 1956 |
| 2,988,955 | Goto et al. | June 20, 1961 |